US006158926A

United States Patent [19]
Precetti

[11] Patent Number: 6,158,926
[45] Date of Patent: Dec. 12, 2000

[54] SUCTION SYSTEM FOR URBAN WASTES AND FOR RECYCLABLE MATERIALS

[75] Inventor: Massimo Precetti, Via Celso N°21/A, 54035 Fosdinovo (MS), Italy

[73] Assignees: Termomeccanica S.p.A.; Massimo Precetti; Cappellotto S.p.A., all of, Italy

[21] Appl. No.: 09/126,043

[22] Filed: Jul. 30, 1998

[30] Foreign Application Priority Data

May 13, 1998 [IT] Italy ................................ MI98A1042

[51] Int. Cl.[7] ........................................ B60P 1/60

[52] U.S. Cl. .......................... 406/39; 406/116; 406/141; 406/168; 100/100; 15/340.1

[58] Field of Search ................................ 406/39, 44, 50, 406/116, 141, 168, 171; 210/241; 100/100, 125; 15/340.1

[56] References Cited

U.S. PATENT DOCUMENTS

| | | | |
|---|---|---|---|
| 2,002,993 | 5/1935 | Ehrick et al. | 15/340.1 |
| 3,348,258 | 10/1967 | Daneman | 15/340.1 |
| 3,613,915 | 10/1971 | Vita | 406/39 |
| 3,995,754 | 12/1976 | DeKoning . | |
| 4,019,219 | 4/1977 | Willenborg | 15/340.1 |
| 4,232,632 | 11/1980 | Kice | 406/171 |

FOREIGN PATENT DOCUMENTS

| | | | |
|---|---|---|---|
| 0220936 | 5/1987 | European Pat. Off. . | |
| 0408820 | 1/1991 | European Pat. Off. . | |
| 2728879 | 7/1996 | France . | |
| 4331191 | 3/1995 | Germany . | |
| 197203 | 8/1989 | Japan | 406/116 |

*Primary Examiner*—Christopher P. Ellis
*Assistant Examiner*—Joe Dillon, Jr.
*Attorney, Agent, or Firm*—Hedman, Gibson & Costigan, P.C.

[57] ABSTRACT

A suction system for urban wastes and for recyclable materials comprising a motorized transport means (10) suitable to receive urban wastes and/or recyclable materials placed in a container (36) or left on the ground, wherein said transport means (10) is provided with a sucking tube (15, 17, 18, 23) which can be moved in order to suck and/or which can be inserted by means of actuators (20, 25) inside an opening (30) formed in an underground container (36), closing means (27) are provided for the opening (30), said means being provided with an opening (35) of predetermined size. Preferably, said closing means comprise a sliding turret (27) which can be moved when the sucking tube is activated.

13 Claims, 4 Drawing Sheets

SUCTION SYSTEM FOR URBAN WASTES AND FOR RECYCLABLE MATERIALS

The present invention relates to a suction system for urban wastes and for recyclable materials.

Currently, the urban wastes are collected in specific dumpsters which are then emptied into trucks devoted to collect said wastes.

This collection system requires the use of these dumpsters which are not very aesthetic nor hygienic when placed in the streets.

Further, these dumpsters have swinging covers which can be damaged by the users and mostly by the collection means, i.e. by the special trucks used to collect the urban wastes. Besides, when the dumpsters are picked up and overturned, they may accidentally fall with consequent breaks and significant repair costs.

Further, during the collection phase, the dumpsters, due to their structure and to their content, make a lot of noise which disturbs the neighbourhoods since said operation is preferably done during the early morning hours.

The dumpsters have also to be subjected to maintenance and to washing and sanitizing, which is a further complication due to their structure.

A purpose of the present invention is to manufacture a waste collection system different from the one carried out by the dumpsters and by the relative trucks.

Another purpose is to solve all the above mentioned problems related to the dumpsters.

These purposes, according to the present invention, are achieved by providing a suction system for urban wastes and for recyclable materials comprising a motorized transport means capable of receiving urban wastes and/or recyclable materials placed in a container, characterised in that said transport means is provided with a sucking tube which can be moved and which can be inserted, by means of actuators, inside an opening formed in an underground container, and closing means are provided for the opening, said means being provided with an opening of predetermined size.

Alternatively, a suction system for urban wastes and/or for recyclable materials comprises a motorized transport means capable of receiving urban wastes and/or recyclable materials left on the ground, wherein said transport means is provided with a sucking tube which can be moved in order to suck said urban wastes and/or recyclable materials placed on the ground.

Figure 1:
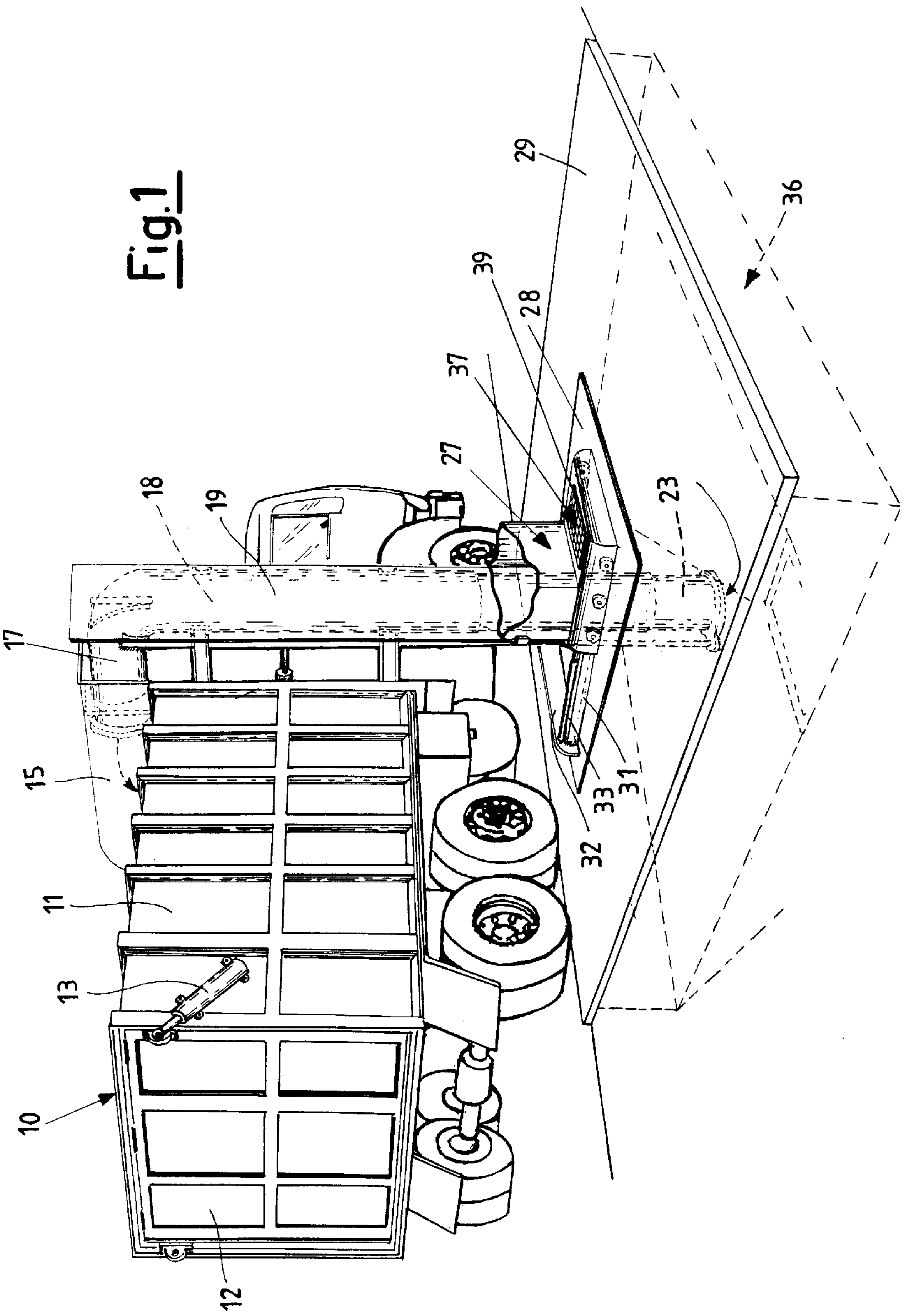
Figure 2:
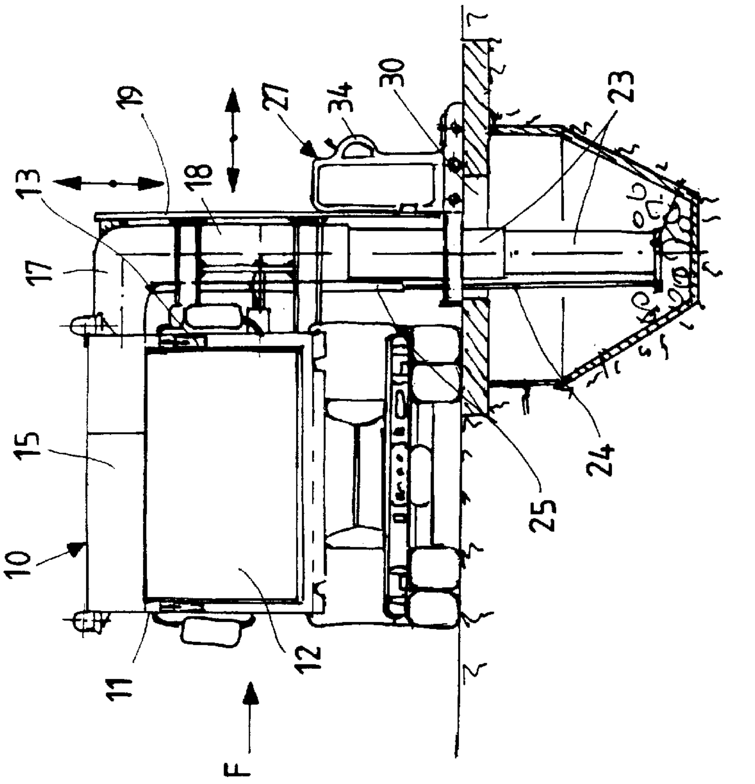
Figure 3:
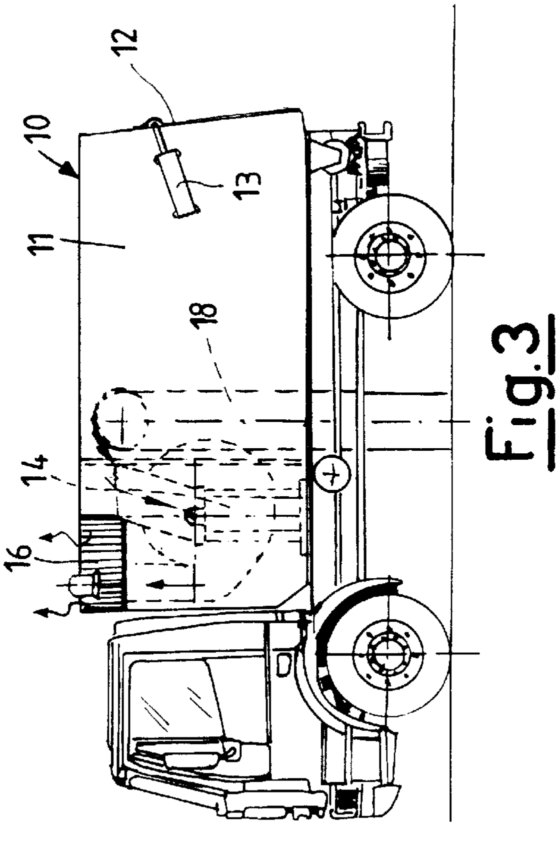
Figure 6:
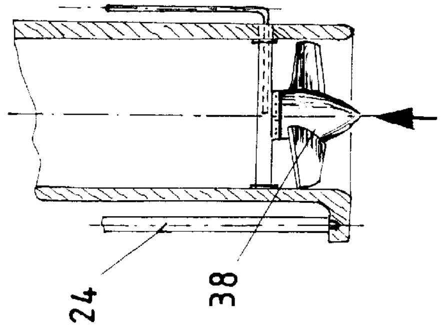
Figure 4:
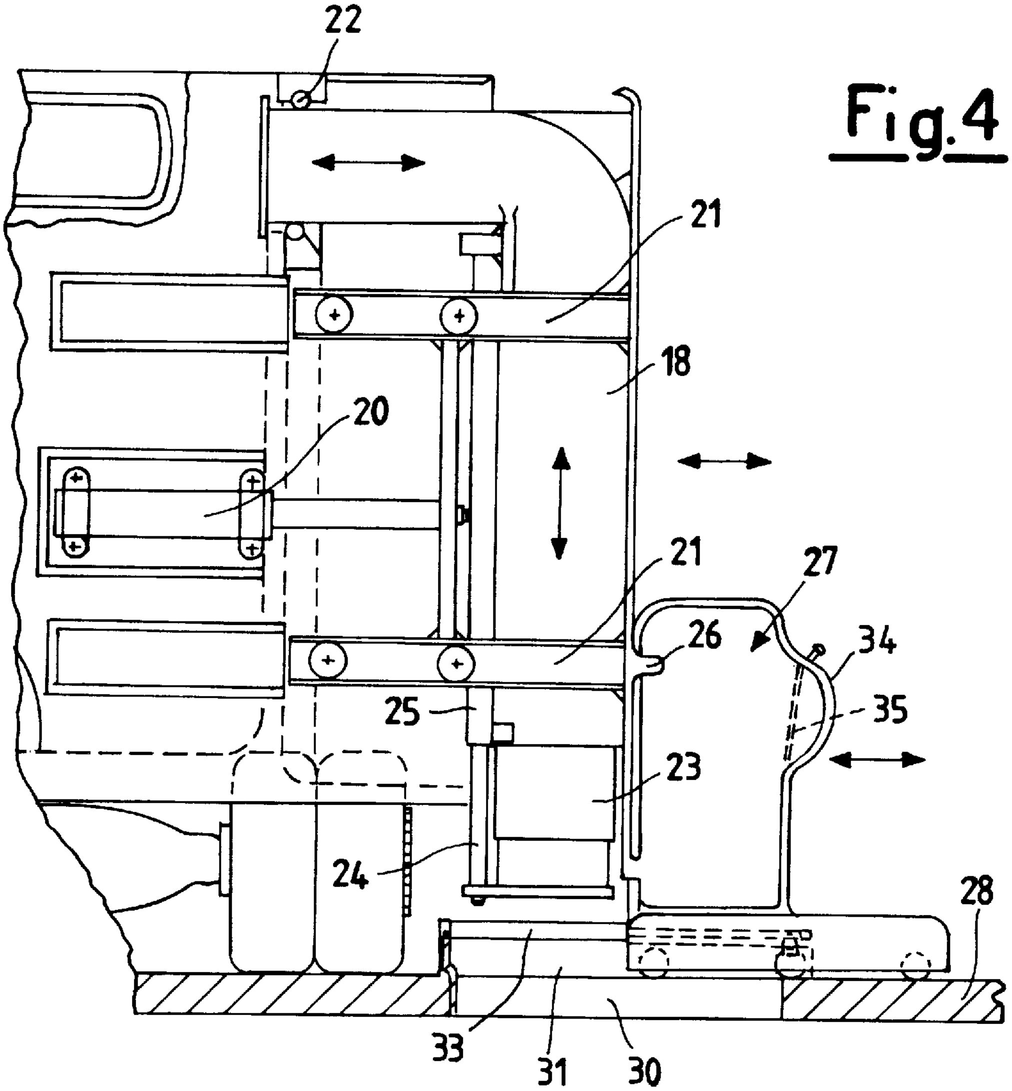
Figure 5:
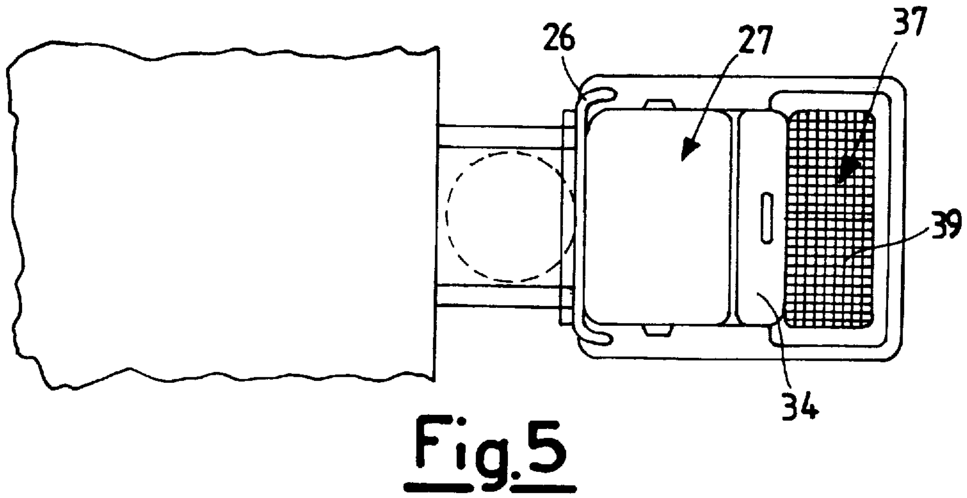
Figure 7:
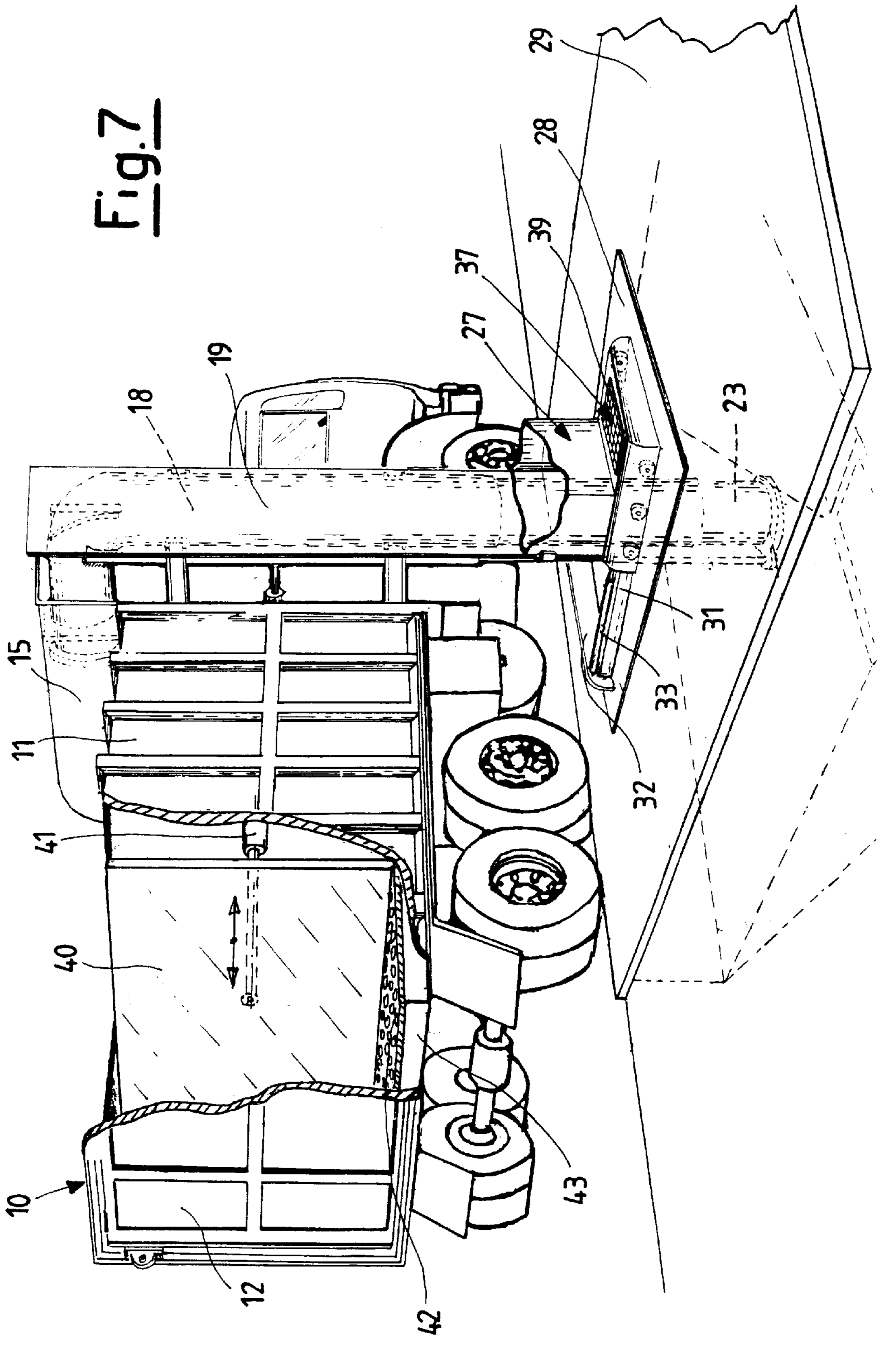

The features and the advantages of a suction system for urban wastes and for recyclable materials according to the present invention will be better understood from the following description of a non limiting example, referred to the accompanying schematic drawings, in which:

FIG. 1 is a schematic perspective view of the suction system for urban wastes and for recyclable materials according to the present invention, FIG. 2 is an elevation view of the rear portion, in partial section, of the view of FIG. 1, FIG. 3 is a side elevation view in the direction of arrow F in FIG. 2, FIG. 4 is an enlarged view of a schematic detail, in partial section, from FIG. 2, FIG. 5 is a plan view of the detail of FIG. 4, FIG. 6 is an enlarged sectional view of the detail of the end of the extendable tube used to collect the wastes, FIG. 7 is a schematic perspective view of a further embodiment of the suction system for urban wastes according to the invention.

Referring in general to the figures previously described, a suction system for urban wastes and for recyclable materials, according to the invention, is shown.

The system of the invention comprises a motorised transport means, as for instance a truck 10, formed substantially by a body 11, provided with a rear wall 12 which can be opened by means of specific actuators, as for instance cylinders 13. The truck 10 has, in its top inner portion, a turbine, indicated by numeral 14, connected, on one side, to the sucking tube and, on the other side, said turbine is open towards the inside portion of the truck body 11.

A filter 16 is placed above the turbine 14, said filter allowing the air inside the truck body 11 to leave the truck 10 after proper filtration.

The sucking tube comprises, in the area positioned above the truck 10, a fixed portion 15 facing one side of the truck 10, and said portion being connected to a curved portion 17 and to a vertical portion 18, both movable from the side wall of the truck. In fact, said curved portion 17 and said vertical portion 18 are placed on a supporting structure 19 which is driven by a cylinder 20 and slides along the supporting guides 21.

Sealing elements 21 are positioned between the curved portion 17 and the fixed portion 15 of the sucking tube, said sealing elements allowing to maintain sealed conditions during the movement of the curved portion 17 in regard to the fixed portion 15 of the sucking tube.

Further, it should be noted that at least a further portion 23 of the tube is positioned at the lower end of the vertical portion 18, said portion can slide inside the vertical portion 18 and it is, for instance, of the telescopic type. The movement of the additional portion 23 of tube is driven by cylinders 25, a stem 24 and a cylinder 25 thereof are shown, said stem and said cylinder being vertically positioned and integral with the supporting structure 19.

Further, the supporting structure 19 has a shaped drive and containment arm 26 suitable to lean on a turret 27, said turret can slide along a fixed supporting base 28. Said turret 27 forms closing means provided with an opening 35 having a predefined dimension, said closing means can be freely moved with respect to an opening 34 of an underground container 36, and said fixed supporting base 28 being integral therewith.

In fact, according to the present invention, the system further comprises an underground container 36 formed by a shaped container placed in a hole excavated in the ground. The underground container 36 has a top container cover 29 wherein an opening 30 is formed. The opening 30 is usually positioned below the supporting base 28 which is integral with the cover 29 of the container.

In particular, it is shown that two side guides 31 are formed on the supporting base 28, as well as a wall 32 transverse thereto. This transverse wall 32 engages the cylinders 33, which cause, even automatically, the turret 27 to return against the transverse wall 32, once the turret has been moved from its initial working position.

The turret 27 has, for instance on its front surface, an openable door 34, associated with an opening 35 provided with a fixed and predetermined size. Once said openable door 34 has been partially removed, for instance by rotatation around its hinges, a sack, containing the urban wastes to be eliminated and to be positioned inside the undreground container 36, is introduced through said opening 35.

A footboard 37, having a weighing surface 39, can be provided in front of the turret 27, below said weighing surface a load cell, not shown, being positioned. In this way, the footboard 37 can be used to weigh the sack containing the wastes or to weigh the person who is putting or has already put the sack into the turret 27.

In FIG. 1, it is shown how the lower end of the sliding portion of the tube 23 is simply open and ready to suck the material or the sacks placed inside the underground container 36 by means of the turbine 14. If necessary, as shown in FIG. 6, a rotating element 38, properly driven, can be placed at the lower end of the portion of tube 23, said rotating element grinding the material contained in the underground container 36 and facilitating the sucking operation and the passage through the various tube portions connected to the sucking turbine 14.

A sucking system for urban wastes, as previously described, is very easy to use, as explained hereinafter.

A user, in order to eliminate a waste containing bag, goes close to the turret 27 placed in its initial working position, i.e. aligned with the opening 30 formed on the top of the underground container 36.

The bag is thrown inside the below container 36 through said turret 27 having reduced dimensions, and positioned at street level.

Before eliminating the bag, the footboard 37, provided with the relative load cell, allows to weigh, if required, the discharged material and simultaneously the person by means of the load cell.

In this way, the discharged material (bags, plastic containers, aluminum, glass, etc.) does never enter in contact with the weighing system thus avoiding the system to be soiled and obstructed.

According to a certain timetable or, at any rate, before the underground container 36 is completely filled, the transport means 10, devoted to collect the wastes, arrives close to the turret 27, and said transport means is positioned on the side of said turret.

The positioning is done so that the hold and guide arm 26, integral with the supporting structure 19, is aligned with the rear portion of the turret. At this point, the cylinder 20 is driven by an operator in order to cause the lateral movement of the supporting structure 19. The drive and containment arm 26 consequently engages the rear portion of the turret 27 thus causing the turret to slide along the guides 31 and freeing the opening 30.

Driving the additional cylinders 25 cause, at this point, the tube portion 23, sliding in the vertical portion 18, to come out. In this way, since the whole sucking tube has come out, the lower end of said tube gains access to the underground waste container and the sucking operation starts.

Said operation is controlled by the operator without leaving the driving place and thus the bag sucking operation is started by lowering, by means of the hydraulic cylinders 25, the telescopic sucking tube.

The powerful turbine 14, by creating the vacuum inside the truck body 11, causes the bags to climb through the various sections 15, 17, 18, 23 of the sucking tube and then to fall inside said body.

The air, coming from the inside of the truck body 11 and sucked by the turbine 14, is sent back in the atmosphere after filtration through the specific filter 16 in order to eliminate the unpleasant odours.

As already said, the bags can be sucked by the sucking opening as they are, shown in FIG. 1, or they can be first ground by the rotating element 38, as for instance a centrifugal grinding device, and then sucked.

Once the bag sucking operations are finished, the operator drives the hydraulic cylinder 25 which lifts again the tube sucking sections and then the horizontal hydraulic cylinder 20. Said cylinder 20 causes the supporting structure 19 to go back close to the truck and therefore to let the turret 27 free to go back to its initial working position, ready to receive additional bags, by means of the cylinders 33.

In a different embodiment, the sucking tube can be provided with a spray system capable, once the sucking operations are finished, of sanitizing the underground containers.

This system for collecting the urban wastes and recyclable materials has significant advantages in comparison with the previous dumpster system.

The waste bags are discharged into the containers placed below the street level and therefore said containers are of difficult access for the public.

The waste containers, since they are underground, keep the wastes, especially during the summer time, at low temperature thus allowing to collect the wastes at longer periods of time than the current ones.

The traditional dumpsters are eliminated and substituted, at street level, by a turret with reduced dimensions, said turret allowing the access to the underground container realised in several sizes. The walls of the turret can advantageously be used for advertising.

The municipalities will no longer have to sustain the costs of repaairing and of substituting the dumpsters (in particular the covers damaged by the collecting means) and will no longer have unaesthetic elements placed in the streets.

The same sucking truck is suitable to collect both the urban and the recycled wastes.

The turbines are sound-proof and have a noise level of about 80 Db, thus eliminating any previous inconvenience. The waste collection operations will then be much less noisy than the current ones.

The trucks used to wash the dumpsters and the operators devoted to perform said operation will be eliminated since the sucking truck is capable of sanitizing the containers by itself.

The collection will be done every two-three days and the duration of the operation will be for sure less than the current one.

There is no more the danger of falling dumpsters during the lifting operations in order to empty the dumpsters with the possibility of breakings and of accidents.

During the evacuation of the container placed below the street level, the hole of access, wherein the sucking tube is introduced, does never remain open, since, when the turret 27 is moved to the side, the sucking tube covers said hole.

Some underground containers can be devoted to collect materials separately (plastics, aluminum, glass, etc) since the system is able to suck also these products. Since the underground container are very large, the collection may be done at long time intervals with a consequent cost saving.

Further, a significant general cost saving is obtained by eliminating the dumpsters, which are substituted, in the streets or in special areas, by corresponding containers placed below the street level.

In a simplified embodiment, the sucking system for urban wastes and for recyclable materials of the invention simply comprises a motorized transport means 10 capable of receiving urban wastes and/or recyclable materials placed on the ground, wherein said transport means 10 being provided with a sucking tube 15, 17, 18, 23 which can be moved in order to suck the urban wastes and/or the recyclable materials simply placed on the ground.

FIG. 7 shows a further embodiment, wherein equal elements have the same reference number. In particular, a truck 10, provided with the sucking tube as described in FIG. 1, has a hydraulic compacting system placed inside the body 11.

In fact, a compacting plate 40 is provided in the body 11, wherein said plate is moved by an actuator, as for instance a cylinder 41 which interacts between said plate and a fixed portion of the body 11. In this particular case, the bottom of the body 11 has openings or, more simply, it is made of a perforated plate 42 and a liquid collection tank 43 is placed below said perforated plate.

In this way, once the urban wastes have been sucked by the sucking tube inside the body 11, the cylinder 41, which causes the compacting plate 40 to move, is acivated. The urban wastes are then compacted and the liquid, coming out through the perforated plate 42, is collected in the tank 43 below.

Naturally, said tank 43 shall be provided with a discharge valve or tap, not shown, through which said tank will be emptied.

In the shown example, the vertical compacting plate slides towards the rear wall 12 of the body 11, but a horizontal compacting plate could be provided as well, wherein said horizontal plate moves towards the top or the bottom of the body 11, or in both directions toward the centre of the body.

In this way, a system which can separate the dry portion of the wastes from the liquid one is obtained. Such an arrangement, thanks to the repeated waste compacting operation, can eliminate most of the liquid in order to obtain an almost dry waste. The wastes arriving at the dumps or at the incinerators will be dry enough to enhance the following waste treatment phases.

What is claimed is:

1. Suction system for urban wastes and for recyclable materials comprising a motorized transport means (10) including a turbin which receives urban wastes and/or recyclable materials placed on the ground, characterised in that said transport means (10) is provided with a sucking tube (15, 17, 18, 23) which can be moved in order to suck said urban wastes and/or recyclable materials placed on the ground.

2. Suction system for urban wastes and for recyclable materials comprising a motorized transport means including a turbine and (10) capable of receiving urban wastes and/or recyclable materials placed in an underground container (36), characterised in that said transport means (10) is provided with a sucking tube (15, 17, 18, 23) which can be moved and which can be inserted, by means of actuators (20, 25), inside an opening (30) formed in a container (36); closing means (27) are provided for said opening (30), said means being provided with an opening (35) of predetermined size.

3. System as claimed in claim 2, characterised in that said sucking tube is provided with a curved portion (17) and with a vertical portion (18) placed on a supporting structure (19) which can be moved in relation to said motorized transport means (10), and at least a sliding tube portion (23) being placed inside said tube vertical portion.

4. System as claimed in claim 2, characterised in that a footboard (37) is provided on said turret (27) said footboard being provided with a weighing surface (39).

5. System as claimed in claim 2, characterised in that said sucking tube is provided, at a free end of a vertical portion (18), with a grinding rotating element (38).

6. System as claimed in claim 2, characterised in that said turret (27) has a side opening (35) which is provided with an openable door (34).

7. System as claimed in claim 2, characterised in that said underground container (36) has a top cover (29) wherein said opening (30) is formed.

8. System as claimed in claim 2, characterised in that said closing means comprises a turret (27) which can slide over a supporting base (28) integral with said underground container (36).

9. System as claimed in claim 8, characterised in that said sucking tube is provided with movable portions (17, 18, 23) placed on a supporting structure (19) which has a drive and containment arm (26) capable of interacting with said turret (27).

10. System as claimed in claim 1, characterised in that said motorized transport means (10) is provided, in its body (11), with a compacting plate (40) which can be moved by an actuator (41), the bottom wall of said body (11) being provided with openings (42) and a liquid collecting tank (43) being provided below said body (11).

11. System as claimed in claim 10, characterised in that said bottom wall is made of a perforated plate (42).

12. System as claimed in claim 2, characterised in that said sucking tube is provided with a turbine is (14) placed at one end a positioned inside the body (11) of said motorized transport means (10).

13. System as claimed in claim 12, characterised in that a filter (16) is associated with said turbine (14).

* * * * *